United States Patent
Manivasagam et al.

(10) Patent No.: US 11,675,582 B2
(45) Date of Patent: Jun. 13, 2023

(54) NEURAL NETWORKS TO IDENTIFY SOURCE CODE

(71) Applicant: Kyndryl, Inc., New York, NY (US)

(72) Inventors: Balasubramanian Manivasagam, Bengaluru (IN); Thomas Domin, Bangalore (IN); Sakthimurugan Arumugam, Bangalore (IN); Thangadurai Muthusamy, Bangalore (IN); Raja Sreenivasan, Bangalore (IN)

(73) Assignee: KYNDRYL, INC., New York, NY (US)

( * ) Notice: Subject to any disclaimer, the term of this patent is extended or adjusted under 35 U.S.C. 154(b) by 42 days.

(21) Appl. No.: 17/376,610

(22) Filed: Jul. 15, 2021

(65) Prior Publication Data

US 2023/0016897 A1    Jan. 19, 2023

(51) Int. Cl.
| | |
|---|---|
| *G06F 8/71* | (2018.01) |
| *G06F 8/10* | (2018.01) |
| *G06F 40/20* | (2020.01) |
| *G06N 20/00* | (2019.01) |
| *G06F 18/2415* | (2023.01) |

(52) U.S. Cl.
CPC .................. *G06F 8/71* (2013.01); *G06F 8/10* (2013.01); *G06F 18/24155* (2023.01); *G06F 40/20* (2020.01); *G06N 20/00* (2019.01)

(58) Field of Classification Search
CPC ... G06F 8/71; G06F 8/10; G06F 40/20; G06F 18/24155; G06K 9/6278; G06N 20/00
See application file for complete search history.

(56) References Cited

U.S. PATENT DOCUMENTS

| | | | | |
|---|---|---|---|---|
| 7,149,734 B2 * | 12/2006 | Carlson | .................... | G06F 8/36 |
| 7,640,532 B2 * | 12/2009 | Jain | ........................ | G06Q 10/06 |
| | | | | 717/102 |
| 8,037,449 B2 | 10/2011 | Iborra et al. | | |
| 8,307,351 B2 | 11/2012 | Weigert | | |
| 8,479,161 B2 | 7/2013 | Weigert | | |
| 8,688,676 B2 * | 4/2014 | Rush | ......................... | G06F 8/36 |
| | | | | 707/706 |
| 8,943,465 B2 | 1/2015 | Broadfoot et al. | | |
| 8,972,372 B2 * | 3/2015 | Elbaum | .................. | G06F 16/93 |
| | | | | 717/136 |

(Continued)

FOREIGN PATENT DOCUMENTS

CN        102118500 B      8/2013

OTHER PUBLICATIONS

Anonymous, "Existing Code Reuse System Base on Comments in Code," https://ip.com/IPCOM/00238483, Aug. 2014, 3 pages.

(Continued)

*Primary Examiner* — Douglas M Slachta
(74) *Attorney, Agent, or Firm* — Tutunjian & Bitetto, P.C.; Erik Swanson

(57)  ABSTRACT

Search elements are extracted from requirement definitions of a requirement management tool for managing a project. The search elements may be extracted using natural language processing. The search elements are used to identify source code from source code repositories. Machine learning correlates the requirement definitions to source code subject matter. The extracted source code is confirmed by a stakeholder of the requirement management tool.

15 Claims, 8 Drawing Sheets

(56) References Cited

U.S. PATENT DOCUMENTS

| | | | |
|---|---|---|---|
| 9,021,416 B2 | 4/2015 | Grechanik et al. | |
| 9,940,216 B2 | 4/2018 | Frenkiel et al. | |
| 10,977,156 B2* | 4/2021 | McGloin | G06F 8/75 |
| 2002/0198873 A1* | 12/2002 | Chu-Carroll | G06F 8/36 |
| 2011/0087689 A1* | 4/2011 | Ziegler | G06Q 10/10 |
| | | | 715/764 |
| 2014/0181125 A1 | 6/2014 | Moitra et al. | |
| 2016/0292803 A1* | 10/2016 | Morimoto | G06F 16/93 |
| 2019/0050319 A1 | 2/2019 | Gondalia et al. | |
| 2020/0004583 A1* | 1/2020 | Kelly | G06F 9/451 |
| 2020/0117446 A1* | 4/2020 | Smith | G06F 8/36 |
| 2020/0183664 A1* | 6/2020 | Lee | G06F 8/38 |

OTHER PUBLICATIONS

Anonymous, "Machine learning based technique to predictively identify code repositories relevant to a work-item in a collaborative project management platform," https://ip.com/IPCOM/000260506, Nov. 2019, 5 pages.

Mell, Peter, et al., "The NIST Definition of Cloud Computing," Sep. 2011, 7 pages.

* cited by examiner

NEURAL NETWORKS TO IDENTIFY SOURCE CODE

BACKGROUND

The present invention generally relates to source code, and more particularly to optimizing searches for source code.

Software developers may use software to track requirements. In some examples, the requirements get created as epic/story/task for the development team to write code. Development of software can benefit from structure for work: from the largest objectives down to the minute details. Epics, stories, themes, and initiatives are some examples of tools needed to do so. Stories, also called "user stories," are short requirements or requests written from the perspective of an end user. Epics are large bodies of work that can be broken down into a number of smaller tasks (called stories). Initiatives are collections of epics that drive toward a common goal. Themes are large focus areas that span the organization.

When the requirement gets created for the development team to write code, the programmer might write their own code or make use of open source solutions based on his/her technology expert level. In such cases, there might be another solution available for the same requirement within the organization from other divisions or open source or licensed versions. However, the programmer might not be aware of them. Hence, the programmer will write their own code or make use of a possibly less reliable open source solution. This may not be a good stable or supported code.

SUMMARY

In accordance with an embodiment of the present invention, a computer-implemented method is provided for searching source code using definitions for requirements from a requirement management tool for search elements. In one embodiment, the computer-implemented method may include extracting search elements from requirement definitions of a requirement management tool for managing a project. The search elements are used to extract source code from source code repositories, wherein machine learning correlates the requirement definitions to source code subject matter. The extracted source code is confirmed by a stakeholder of the requirement management tool.

In another embodiment, a system is provided for searching source code using definitions for requirements from a requirement management tool for search elements. In one embodiment, the system includes a hardware processor, and a memory that stores a computer program product, which, when executed by the hardware processor, causes the hardware processor to extract search elements from requirement definitions of a requirement management tool for managing a project. The hardware processor may then employ the search elements to extract source code from source code repositories. In some embodiments, machine learning correlates the requirement definitions to source code subject matter. The hardware process may also provide that a stakeholder confirm that the extracted source code meets the requirements of the requirement management tool for the project.

In yet another embodiment, a computer program product is provided for optimizing distribution of shipping items comprising a computer readable storage medium having computer readable program code embodied therewith, the program instructions executable by a processor to cause the processor to extract, using the processor. search elements from requirement definitions of a requirement management tool for managing a project. The hardware processor may then employ the search elements to extract source code from source code repositories. In some embodiments, machine learning correlates the requirement definitions to source code subject matter. The hardware process may also provide that a stakeholder confirm that the extracted source code meets the requirements of the requirement management tool for the project.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The methods, systems and computer program products described herein are directed to locating source code meeting the requirements of developers based upon descriptions of requirements for source code employed in requirement management tools. In some instances, software developers search for source code for a particular use case/business logic from the internet and re-use open source code or write their own code. Searching and identifying the optimal and efficient code from the internet or open source package from an authentic source. In some instances, for use, the code is sought from an authentic source having a license (e.g., if it commercial or open source), reliability is desired, and support of the source code can also be important, when the overall product incorporating that source code goes into use. The quality of searches for source code, as well as the quality of source code found by those searches, can also be important when the product incorporating that source code goes into use.

In some embodiments, the methods, systems and computer program products of the present disclosure can identify source code in a more expedient and trustworthy fashion by employing the definitions of requirements created in requirement management tools to search internal source code repositories for the entity looking to use the source code, or by employing the definitions of requirements created in requirement management tools to search open source repositories that are external to the entity looking to use the source code. For example, immediately after requirements are created in a requirement management tool, the source code is identified from the internal source code repository of the organization that created the requirements in the requirement management tool, or source code is identified from an internet source that is external, such as an internet based repository of searchable, e.g., open source, source code. In some embodiments, once the source code is identified, personnel performing software development functions, such as software architects and/or a development lead for the software project, can verify and approve the identified source code for reuse in applying the source code to a business use case. By employing the requirement definition from requirement management tools, and searching internal as well as external sources for a business for source code meeting those requirement definitions, the methods, systems and computer program products can reduce development time. The methods, systems and computer program products can also provide reliable and scalable solution stacks for the stakeholder of the requirements. The methods, systems and computer program products that provide for locating source code meeting the requirements of developers based upon descriptions of requirements for source code employed in requirement management tools are now described with greater detail with reference to FIGS. 1-8.

Figure 1:
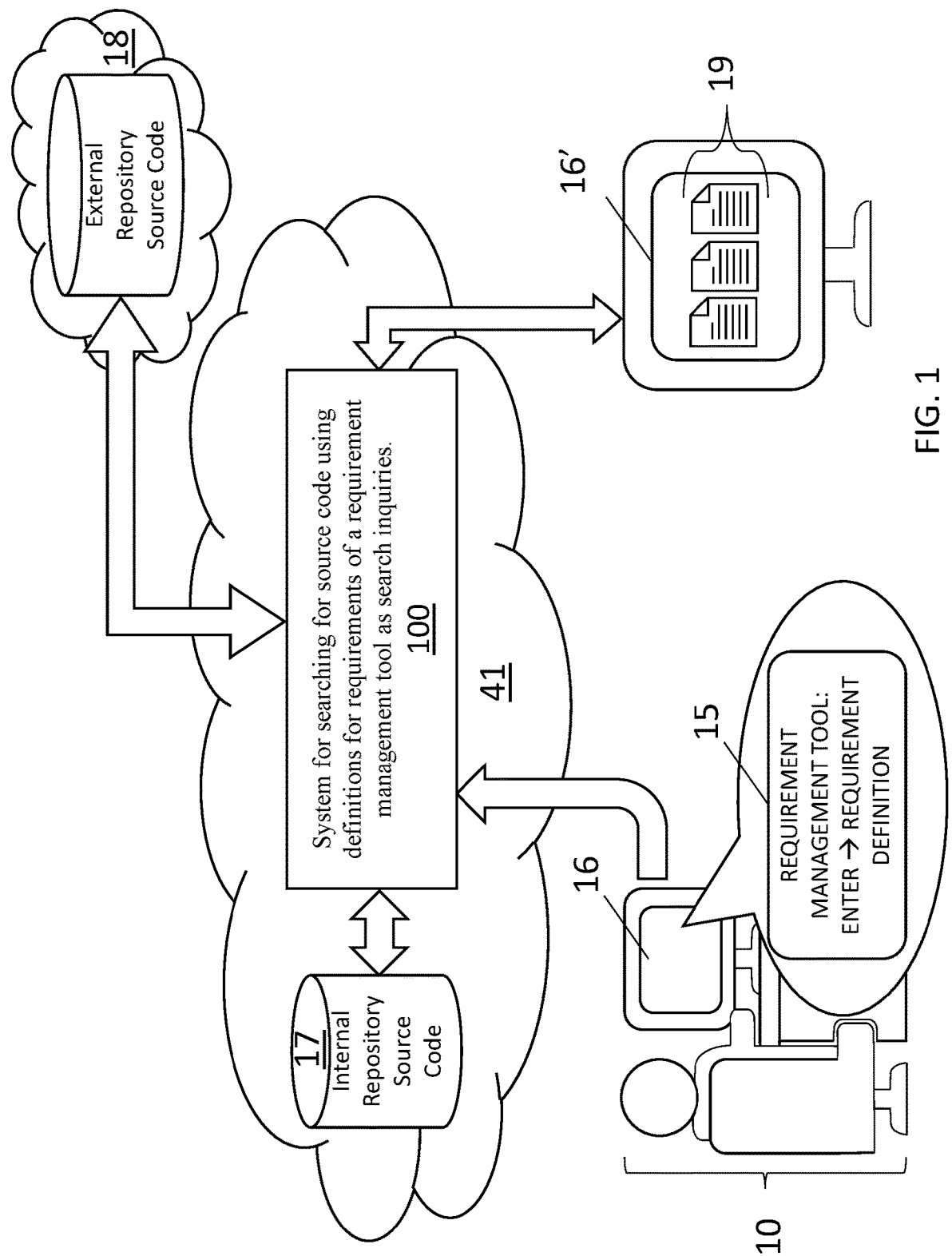
FIG. 1 is an illustration of an exemplary environment where a system is used to search for source code that employs the definitions for requirements for a software project from a requirement management tool to search both internal and external source code repositories for locating matching source code, in accordance with one embodiment of the present disclosure.
Figure 2:
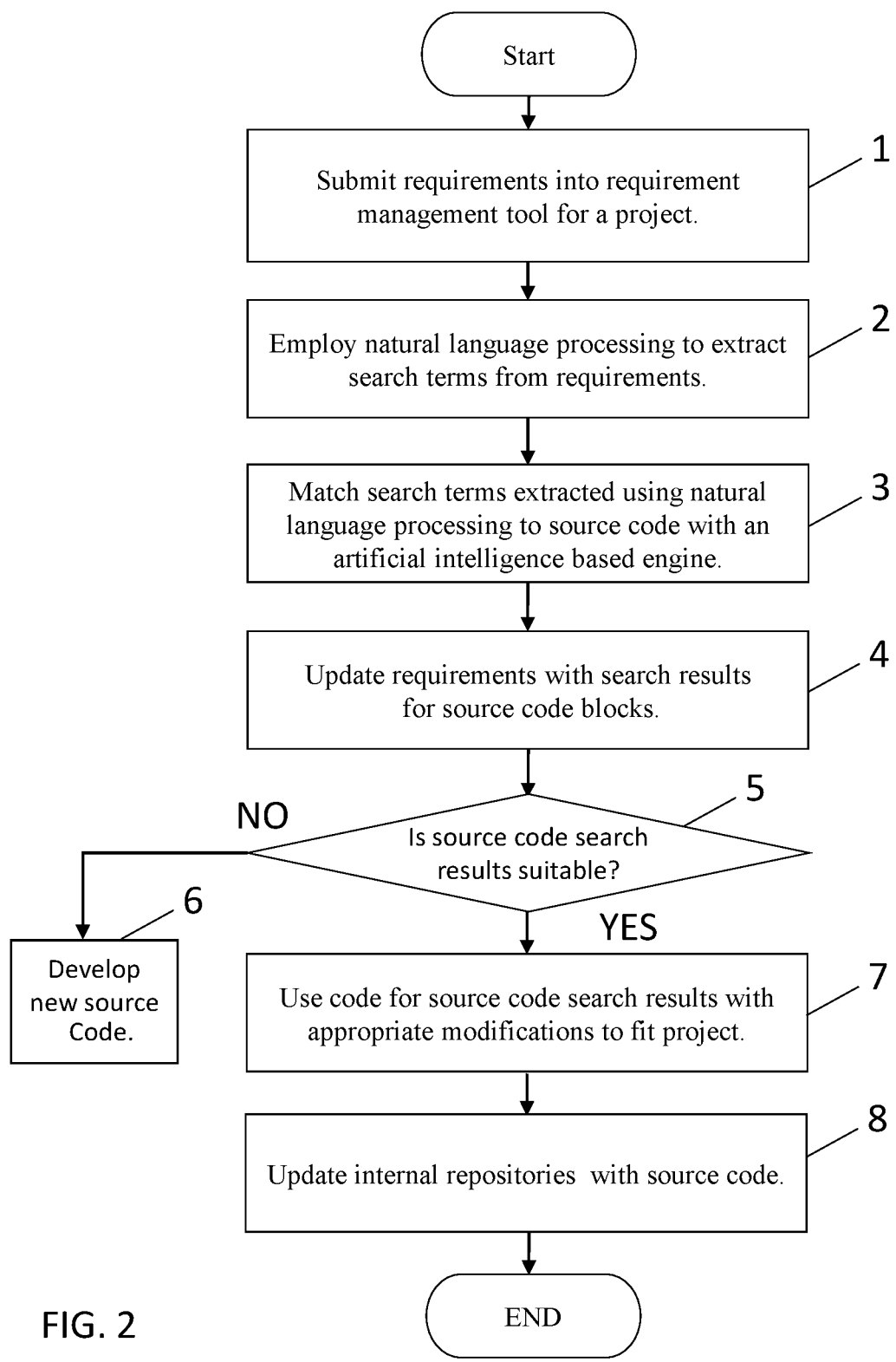
FIG. 2 is a flow chart/block diagram illustrating a method for searching for source code that employs the definitions for requirements for a software project from a requirement management tool to search both internal and external source code repositories for locating matching source code, in accordance with one embodiment of the present disclosure.
Figure 3:
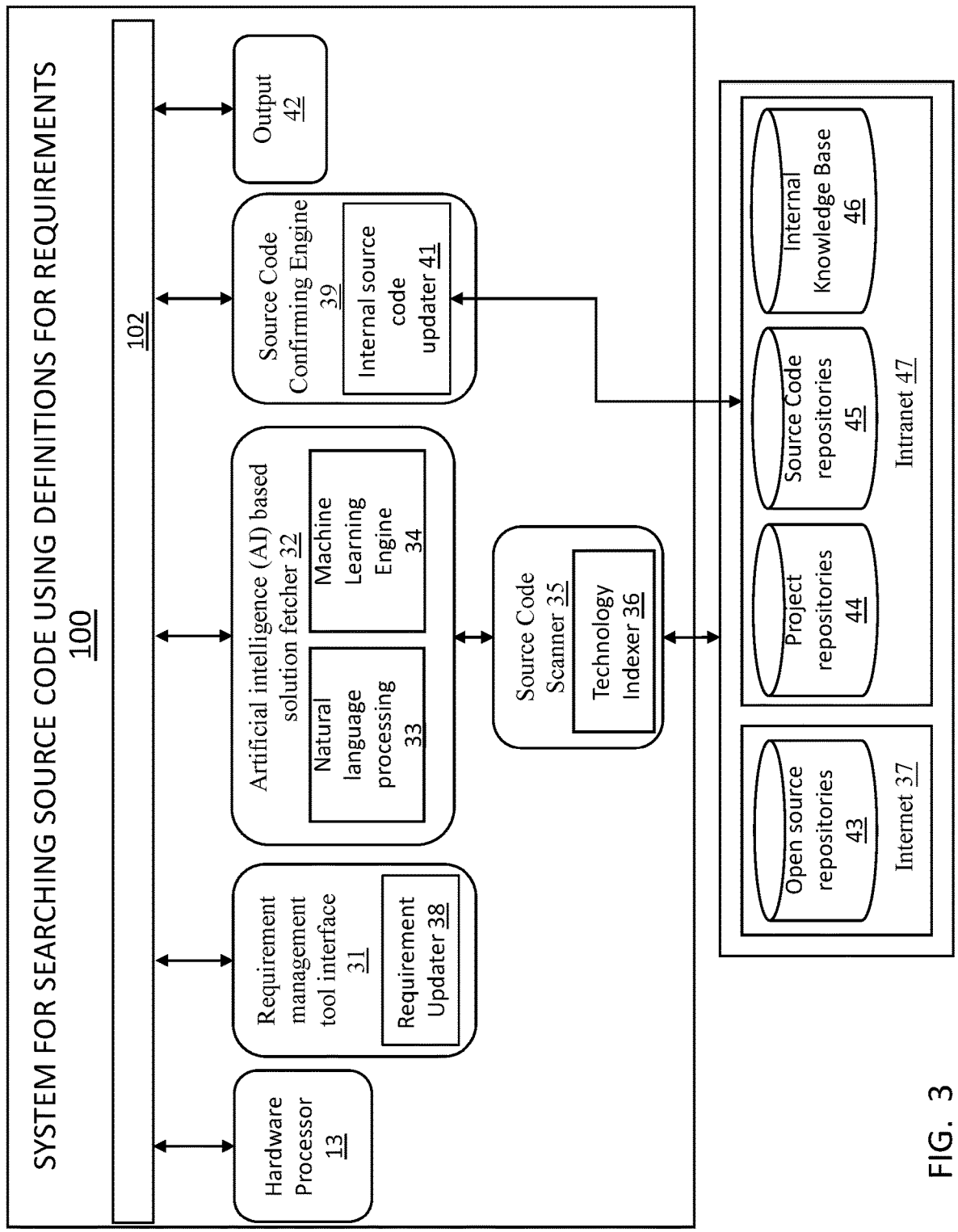
FIG. 3 is a block diagram illustrating one embodiment of a system for searching for source code using definitions for requirements of a requirement management tool as search terms, in accordance with one embodiment of the present disclosure.

FIG. 1 illustrates an exemplary environment where a system 100 is used to search for source code that employs the definitions for requirements for a software project from a requirement management tool to search both internal and external source code repositories for locating matching source code. FIG. 2 illustrates a method for searching for source code that employs the definitions for requirements for a software project from a requirement management tool to search both internal and external source code repositories for locating matching source code. FIG. 3 illustrates one embodiment of a system 100 that can be used in the exemplary environment depicted in FIG. 1, and can be used in the method described with reference to FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an illustration of an exemplary environment where a system 100 is used to search for source code that employs the definitions for requirements for a software project from a requirement management tool to search both internal and external source code repositories for locating matching source code. A user 10, e.g., software developer (such as a manager of a software development team) can enter requirements for a software development project into a requirements management tool 15. The purpose of the requirement management tool is to ensure product development goals are successfully met. The project management tool 15 can include a set of techniques for documenting, analyzing, prioritizing, and agreeing on requirements so that engineering and software development teams always have current and approved requirements. Requirements management provides a way to avoid errors by keeping track of changes in requirements and fostering communication with stakeholders from the start of a project throughout the engineering lifecycle. A requirements management plan (RMP) helps explain how management of a project will receive, analyze, document and manage all of the requirements within a project. The plan usually covers everything from initial information gathering of the high-level project to more detailed product requirements that could be gathered throughout the lifecycle of a project. Key items to define in a requirements management plan are the project overview, requirements gathering process, roles and responsibilities, tools, and traceability.

A requirements management process can include the following steps: 1) collect initial requirements from stakeholders; 2) analyze requirements; 3) define and record requirements; 4) prioritize requirements; 5) agree on and approve requirements; 6) trace requirements to work items; 7) query stakeholders after implementation on needed changes to requirements; 8) utilize test management to verify and validate system requirements; 9) assess impact of changes; and 10) revise requirements and document changes. By following these steps, engineering teams are able to harness the complexity inherent in developing smart connected products. Using a requirements management solution helps to streamline the process so you can optimize your speed to market and expand your opportunities while improving quality.

In some examples, the requirements get created as epic/story/task for the development team to write code. Development of software can benefit from structure for work: from the largest objectives down to the minute details. Epics, stories, themes, and initiatives are some examples of tools needed to do so. Stories, also called "user stories," are short requirements or requests written from the perspective of an end user. Epics are large bodies of work that can be broken down into a number of smaller tasks (called stories). Initiatives are collections of epics that drive toward a common goal. Themes are large focus areas that span the organization.

FIG. 1 illustrates a member of a development team 10 entering requirements into a requirement management tool 15 through an interface 16 that is in communication with the system 100 for searching for source code that employs the definitions for requirements for a software project from a requirement management tool 15 to search both internal source code repositories 17 and external source code repositories 18 for locating matching source code 19. The interface 16 may be in communication, e.g., wireless communication, with the system 100 through a network 41 that may be provided by the internet. In some embodiments, the system 100 can be on the same network 41 that also contains access to an internal repository for source code 17. The internal repository for source code 17 represents the source code that the business which is preparing requirements for a software project to have requirements managed through the requirement management tool 15 already has access to. For example, the source code that is within the internal repository 17 may be in use in other products being provided by the business that is a stakeholder using the requirement management tool 15. Still referring to FIG. 1, as will be described in greater detail below, when the system 100 cannot find matching source code on the internal repository 17, the system 100 may also search external repositories 18. For example, the system 100 can search for matching source code on an open source code repository that is also present through the internet. For example, the internal repository 17 may be provided on one cloud provider through the internet, while the external repository 18 may be present on the internet through a second cloud provider.

FIG. 2 is a flow chart/block diagram illustrating a method for searching for source code that employs the definitions for requirements for a software project from a requirement management tool to search both internal and external source code repositories for locating matching source code. By "definitions" it is meant the terms used in the description of the requirements for the software project. In some embodiments, the method may begin with a user 10 entering requirements 15 into a requirement management tool at block 1. More specifically, in some embodiments, the Referring to FIG. 3, the system 100 that employs the definitions to search for source code has an interface 31 for receiving the definitions.

At block 2 of the method depicted in FIG. 2, the method may continue with employing natural language processing to extract search terms from the requirement definitions received at block 1. Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation.

Still referring to FIG. 2, following extraction of terms from the definitions for the requirements, the method may continue with matching the extracted search terms to source code with an artificial intelligence based search engine 32 at block 3. Referring to FIG. 3, the artificial intelligence based search engine 32 can include the natural language processing term extractor 33 and a machine learning engine 34. Using the machine learning engine 34, the artificial intelligence based search engine 32 can classify text from the requirement definitions into technology classifications that can be used in combination with a technology indexer 36 of a source scanner 35 that can search different source code repositories for finding the source code meeting the requirements laid out in the requirement management software. The different source code repositories include both internal source code repositories and external source code repositories.

The internal source code repositories may include a repository of source code for the particular project (project repositories 44) and a repository of source code used throughout the entire organization (source code repository 45). These repositories, i.e., the projector repository 44, and the source code repository 45, may be managed, e.g., hosted, by the stakeholder that is using the requirement management tool that provided the requirement definitions. The internal source code repositories may be present on an intranet 47. An "intranet" is a computer network for sharing information, collaboration tools, operational systems, and other computing services within an organization, usually to the exclusion of access by outsiders. The external source code repository can be an archive with the code as well as the hosting facility for software archives, which can include the source codes technical documentation, web pages, snippets, patches, etc. which can be accessed publicly (open-source) or privately. The open source code repository 43 can offer version control to make sure all changes that were done to the stored code are tracked. The open source code repository 43 may be present on an internet 37.

Referring to FIG. 3, the step of extracting search terms from the requirement definitions at block 2 may be performed by artificial intelligence based solution fetcher 32. The artificial intelligence based solution fetcher may include a natural language processing engine 33. The natural language processing engine 33 is about to extract search terms from the requirement definitions. More particularly, in some embodiments, the natural language processing engine 33 of the artificial intelligence based solution fetcher 32 can read requirements from the epic/story/task and feed to a solution scanner via the technology indexer to search the solution available from a commercial offering, an open source repository, or from an internal repository. In some instances, the search may be based on a technology stack chosen by the stakeholder. A technology stack, also called a solutions stack, technology infrastructure, or a data ecosystem, is a list of all the technology services used to build and run one single application. In this case, the single application is the program being built using the source code that is being searched for. The stakeholder can be any person that is working with the requirement management tool that provided the requirement definitions.

Referring to FIG. 2, in some embodiments, the method may continue to block 3, which can include matching the search terms that were extracted from the requirements using natural language processing to source code that is available in a repository. In some embodiments, the search terms extracted by a source code scanner 35 via the technology indexer 35 to search the solution available from a commercial offering, an open source repository, or from an internal repository. In some instances, the search may be based on a technology stack chosen by the stakeholder. A technology stack, also called a solutions stack, technology infrastructure, or a data ecosystem, is a list of all the technology services used to build and run one single application. In this case, the single application is the program being built using the source code that is being searched for. The stakeholder can be any person that is working with the requirement management tool that provided the requirement definitions. The technology indexer 36 can reduce the amount of search results according to the specific technology stack elected by the stakeholder. For example, the technology indexer 36 can process the search request, and search the stub code for technologies in accordance with the technology stack. A method stub or simply stub in software development is a piece of code used to stand in for some other programming functionality.

Following retrieval of potentially matching source code from the repositories, the artificial intelligence based solution fetcher 32 can analyze the search results and determine whether a source code match has been provided. For example, the matching of the search terms to source code that is present in repositories may include searching using a neural network that can be provided by the machine learning engine 34 of the artificial intelligence based solution fetcher 32.

The neural network model for the methods, systems and computer program products that are described herein employs a structure that combines convolutional neural network and text extract network for code identification/classification. The convolutional neural network is trained to identify source code that matches the terms extracted from the user's epic/story/task defined requirements. There is a text extract network that is trained to extract code from the repositories, i.e., internal source code repositories 17 and external source code repositories 18. The text extract network can include the source code scanner 35 and the technology indexer 36, as depicted in FIG. 3.

Referring to FIG. 3, the artificial intelligence (AI) based solution fetcher 32 extracts search elements, e.g., terms, from requirements from the requirement management tool using the natural language processing engine 33. The search elements from the requirements is then fed into the solution code scanner 35 via a technology indexer 36. The artificial intelligence (AI) based solution fetcher 32 then analyzes for matches using the machine learning engine 34.

In some embodiments, the artificial intelligence based solution fetcher 32 includes a machine learning engine 34 to provide a Naïve Bayes classifier coupled with a Kernel density estimation. The Naïve Bayes classifier and the Kernel density estimation is used to classify the extracted code as completely matched or semi-matched code content for the requirement definitions used as search terms extracted from the requirement management tool. The Naïve Bayes algorithm is a supervised learning algorithm, and is used in text classification that includes a high-dimensional training dataset. The Naïve Bayes Classifier is one of the simple and most effective Classification algorithms which helps in building the fast machine learning models that can make quick predictions.

The Naïve Bayes Classifier is a probabilistic classifier, which means it predicts on the basis of the probability of an object. The Naïve Bayes Classifier is called Naïve because it assumes that the occurrence of a certain feature is independent of the occurrence of other features. It is called Bayes, because it depends on the principle of Bayes' Theorem. Bayes' Theorem is used to determine the probability of a hypothesis with prior knowledge. It depends on the conditional probability.

The formula for Bayes' theorem is given as:

$$P(A \mid B) = \frac{P(B \mid A)P(A)}{p(B)}$$

P(A|B) is Posterior probability: Probability of hypothesis A on the observed event B.

P(B|A) is Likelihood probability: Probability of the evidence given that the probability of a hypothesis is true.

P(A) is Prior Probability: Probability of hypothesis before observing the evidence.

P(B) is Marginal Probability: Probability of Evidence.

Part of this analysis by the machine learning engine 34 is an indication of how prior searches for requirements matched with source code that is extracted from the repositories. That prior history of matching searches with requirement definitions to source code is stored in an internal knowledge base 46.

As noted, to provide for source code matches between the extracted terms from the requirement definitions and the source code stored in the repositories 17, 18 further includes a Kernel density estimation. In some embodiments, the Kernel density estimation (KDE) is a non-parametric way to estimate the probability density function of a random variable. Kernel density estimation is a fundamental data smoothing problem where inferences about the population are made, based on a finite data sample. In some embodiments, the KDE estimate works in conjunction with estimating the class-conditional marginal densities of data when using a naive Bayes classifier, which can improve its prediction accuracy.

The use of the Naïve Bayes Classifier and KDE estimate provides indication of how closely the extracted code meets the definitions from the requirements. In some embodiments, an Ensemble Net is used to combine the text classification and classification from the Naïve Bayes Classifier and KDE estimate for final marking of an identified code as being matched or semi-matched. Deep neural networks are used in many state-of-the-art systems for machine perception. Once a network is trained to do a specific task, it cannot be easily trained to do new tasks as it leads to catastrophic forgetting of the previously learned tasks. EnsembleNet accommodates for newer classes of data without having to retrain previously trained submodels. With Ensemblenet only a small portion of the network has to be retrained which makes it computational efficient and also results in higher performance compared to other architectures in the literature. The architecture for EnsembleNet contains two layers of neural networks and only the neural network that is present in the final layer is exposed to rehearsal.

In general, the artificial neural network (ANN) that may be used by the machine learning engine 34 is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 4:
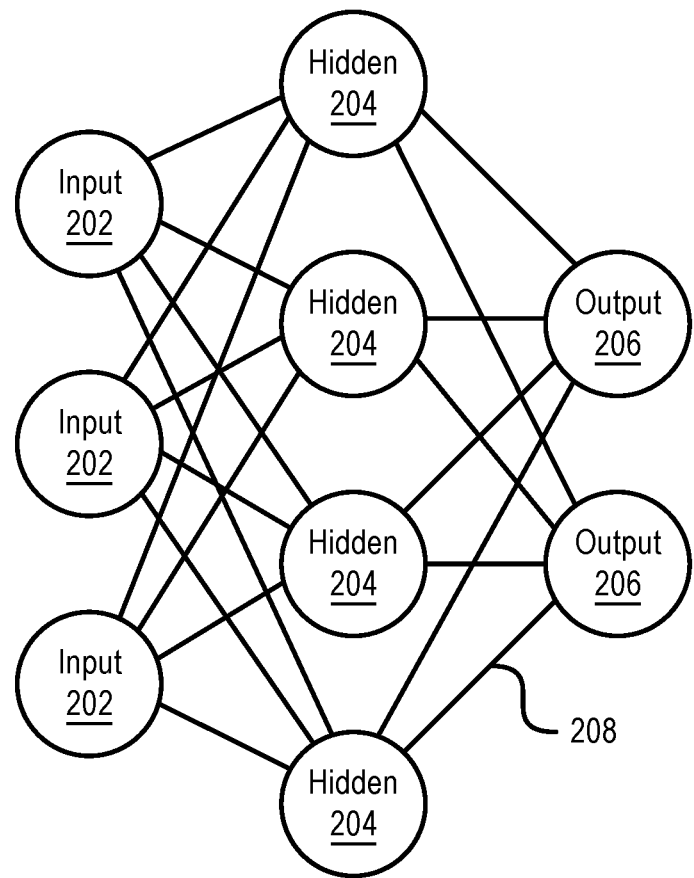
FIG. 4 is an illustration of a generalized diagram of a neural network, in accordance with one embodiment of the present disclosure.
Figure 5:
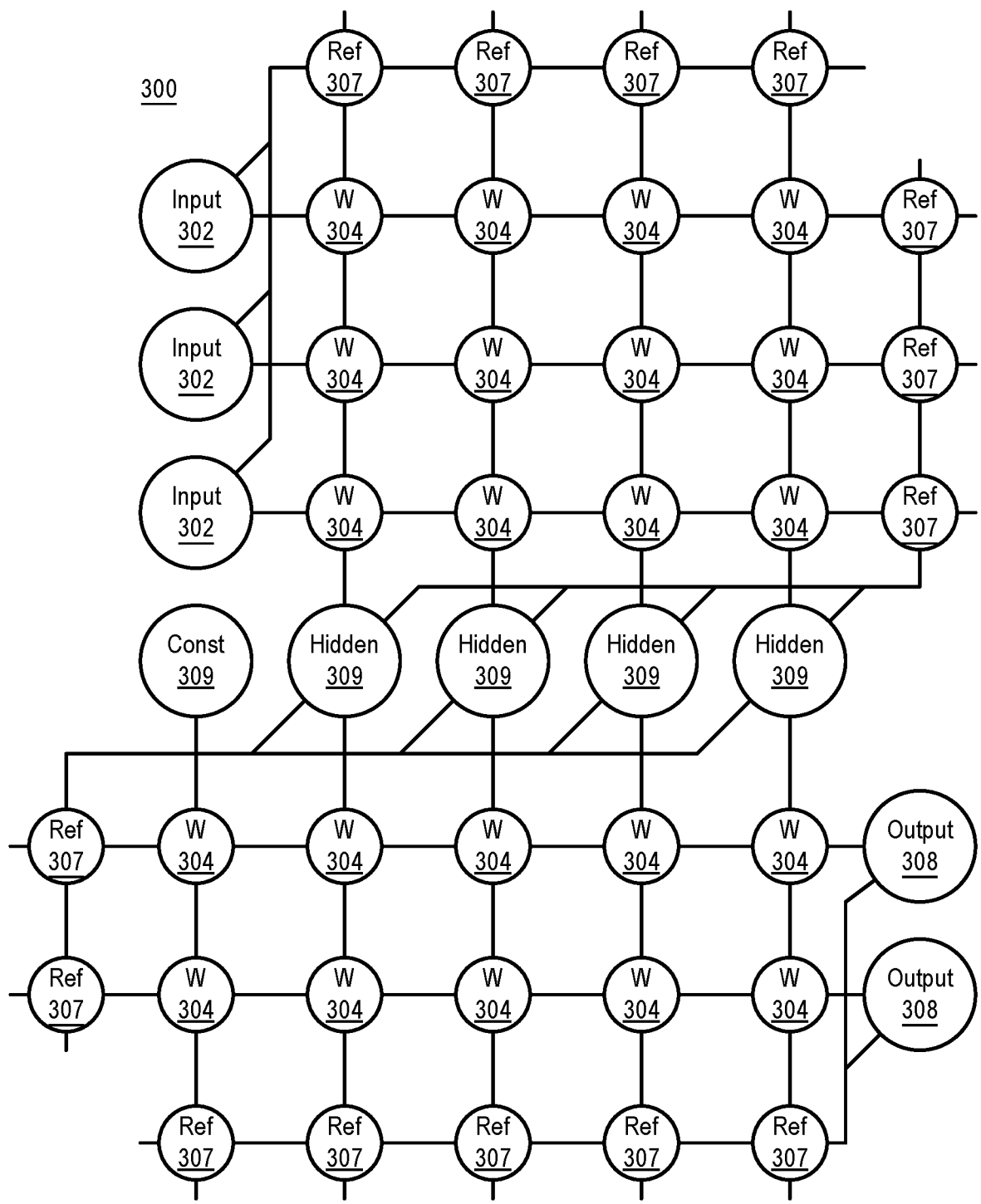
FIG. 5 is an illustration of a hardware architecture for an artificial neural network (ANN), in accordance with one embodiment of the present disclosure.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 202 that provide information to one or more "hidden" neurons 204. Connections 208 between the input neurons 202 and hidden neurons 204 are weighted, and these weighted inputs are then processed by the hidden neurons 204 according to some function in the hidden neurons 204. There can be any number of layers of hidden neurons 204, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 206 accepts and processes weighted input from the last set of hidden neurons 204.

This represents a "feed-forward" computation, where information propagates from input neurons 202 to the output neurons 206. Upon completion of a feed-forward computation, the output is compared to a desired output available from training data. The error relative to the training data is then processed in "backpropagation" computation, where the hidden neurons 204 and input neurons 202 receive information regarding the error propagating backward from the output neurons 206. Once the backward error propagation has been completed, weight updates are performed, with the weighted connections 208 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the machine learning engine 32 trains to match search items extracted from definitions for requirements used in the requirement management tool to source code that is stored in repositories.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 208 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 208 may be implemented as resistive processing units (RPUs), generating a predictable current output when an input voltage is applied in accordance with a settable resistance.

Figure 6:
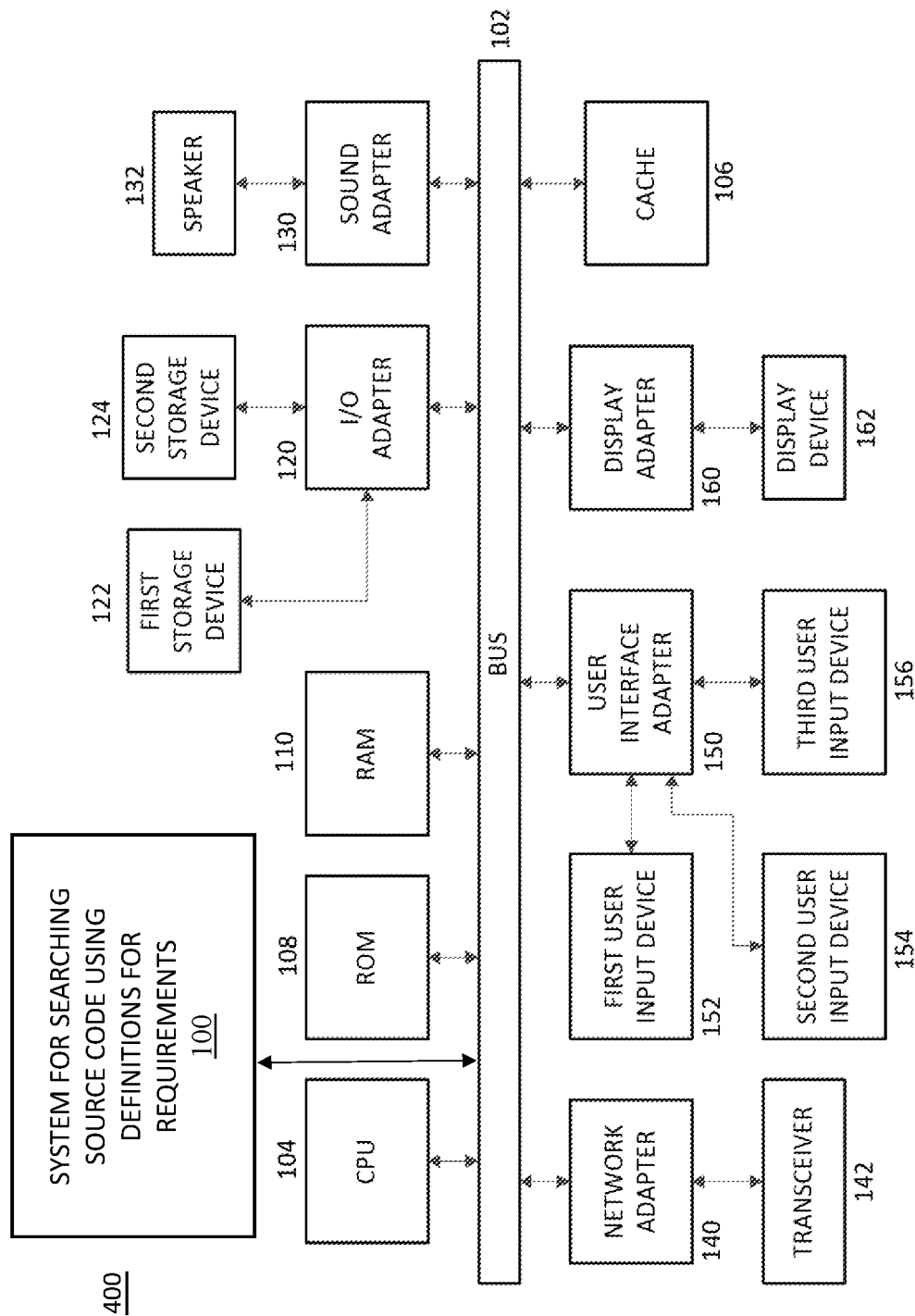
FIG. 6 is a block diagram illustrating a system that can incorporate the system that employs a two-tier distribution optimization including a space model to provide for shipments of an item that are coordinated with containers for the item according to a constraint that is depicted in FIG. 3, in accordance with one embodiment of the present disclosure.

Referring now to FIG. 6, a hardware architecture 300 for an ANN is shown. It should be understood that the present architecture is purely exemplary, and that other architectures or types of neural network can be used instead. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed, and the weights described herein can be replaced with more complicated forms of interconnection.

During feed-forward operation, input neurons 302 each provide an input voltage in parallel to a respective row of weights 304. In the hardware embodiment described herein, the weights 304 each have a settable resistance value, such that a current output flows from the weight 304 to a respective hidden neuron 306. The current output by the weight 304 therefore represents a weighted input to the hidden neuron 306.

Following the hardware embodiment, the current output by a given weight 304 is determined as I=V/r, where V is the input voltage from the input neuron 302 and r is the set resistance of the weight 304. The currents from each of the weights 304 add column-wise and flow to a hidden neuron 306.

A set of reference weights 307 have a fixed resistance and combine their outputs into a reference current that is provided to each of the hidden neurons 306. Because conductance values can only be positive numbers, some reference conductance is needed to encode both positive and negative values in the matrix. The currents produced by the weights 304 are continuously valued and positive, and therefore the reference weights 307 are used to provide a reference current, above which currents are considered to have positive values and below which currents are considered to have negative values. The use of reference weights 307 is not needed in software embodiments, where the values of outputs and weights can be precisely and directly obtained. As an alternative to using the reference weights 307, another embodiment can use separate arrays of weights 304 to capture negative values.

The hidden neurons 306 use the currents from the array of weights 304 and the reference weights 307 to perform some calculation. This calculation may be, for example, any appropriate activation function, and may be implemented in hardware using appropriate circuitry, or in software.

The hidden neurons 306 then output a voltage of their own, based on the activation function, to another array of weights 304. This array performs its weighting calculations in the same way, with a column of weights 304 receiving a voltage from their respective hidden neuron 306 to produce a weighted current output that adds row-wise and is provided to the output neuron 308.

It should be understood that any number of these stages can be implemented, by interposing additional layers of arrays and hidden neurons 306. It should also be noted that some neurons can be constant neurons 309, which provide a constant output to the array. The constant neurons 309 can be present among the input neurons 302 and/or hidden neurons 306 and are only used during feed-forward operation.

During back propagation, the output neurons 308 provide a voltage back across the array of weights 304. The output layer compares the generated network response to training data and computes an error. The error is applied to the array as a voltage pulse, where the height and/or duration of the pulse is modulated proportional to the error value. In this example, a row of weights 304 receives a voltage from a respective output neuron 308 in parallel and converts that voltage into a current which adds column-wise to provide an input to hidden neurons 306. The hidden neurons 306 combine the weighted feedback signal with a derivative of its feed-forward calculation and stores an error value before outputting a feedback signal voltage to its respective column of weights 304. This back propagation travels through the entire network 300 until all hidden neurons 306 and the input neurons 302 have stored an error value.

The weight update process will depend on how the weights 304 are implemented. For settable resistances that include phase change materials, the input neurons 302 and hidden neurons 306 may apply a first weight update voltage forward and the output neurons 308 and hidden neurons 306 may apply a second weight update voltage backward through the network 300. The combinations of these voltages may create a state change within each weight 304, causing the weight 304 to take on a new resistance value, for example by raising a temperature of the weight 304 above a threshold and thus changing its resistance. In this manner the weights 304 can be trained to adapt the neural network 300 to errors in its processing.

As noted above, the weights 304 can be implemented in software or in hardware, for example using relatively complicated weighting circuitry or using resistive cross point devices. Such resistive devices may have switching characteristics that have a non-linearity that can be used for processing data. The weights 304 can belong to a class of device called a resistive processing unit (RPU). The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

In some embodiments, the machine learning engine 32 may employ any type of neural network, such as Autoencoder networks, Convolutional Neural Networks, Recurrent Neural Networks and Long Short-Term Memory Networks, to train to match search items extracted from definitions for requirements used in the requirement management tool to source code that is stored in repositories.

Convolutional Neural Networks—Convolutional neural networks (CNNs) process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

Recurrent Neural Networks—Recurrent neural networks (RNNs) may be used to process sequences of information, such as an ordered series of feature vectors. This makes RNNs well suited to text processing and speech recognition, where information is naturally sequential. Each neuron in an RNN receives two inputs: a new input from a previous layer, and a previous input from the current layer. An RNN layer thereby maintains information about the state of the sequence from one input to the next.

Long Short-Term Memory Networks—Long short-term memory (LSTM) networks are a variety of RNN that store information within the LSTM neurons for future use. Use of the memory may be controlled by the neuron's activation function. The use of this memory helps preserve gradient information during backpropagation.

Autoencoder networks—Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input.

Referring back to FIG. 2, the method may continue with updating the requirements of the requirement search tool to indicate the search results at block 4. In some embodiments, the response for the solution scanner that is logged into the requirements for review by the stakeholder can include the license information for the source code, the version for the source code, the release date for the version of the source code, commercial adaption of the source code, the number of reported defects in the source code, the quality standards used in the source code, and the number of contributors to the source code.

At block 5 of the method, a determination is made whether the source code matched to the requirement definitions meets the expectations/requirements of the stakeholder (user).

The artificial intelligence based search engine 32 in combination with the source code scanner 35 extracts source code from repositories, e.g., generates pseudo code with matched code content. During the execution phase, a user is able to select and view the matched content. Referring to FIG. 1, on the user interface 16', the stakeholder can select and view the matched content 19. Referring to FIG. 3, the system 100 may include an output 42 that is in communication, e.g., wireless communication, with the From the interface, the user can verify that the identified source code 19 is suitable for the requirements of the project being managed through the requirements management tool. Similarly, a user may request that unmatched code content be classified as matched content.

If the source code search results are suitable at block 5, the method may continue to block 7, in which the source code from the source code search results is used with appropriate modifications when necessary to fit the project. If the source code search results are not suitable at block 5, the stakeholders will be notified that arrangements are to be made to develop entirely new source code at block 6.

In some embodiments, when the source code is used to fit the project that the requirement management tool is managing, the method may move to block 8 of FIG. 2. Block 8 of FIG. 2 includes updating the internal repositories with the source code that was identified by the system 100, approved by the stakeholders, and being implemented into the project. In some cases, the original epic/story/task definitions and the matched content can be stored as a training set. Referring to FIG. 3, the training set may be used by the machine learning engine 34 of the artificial intelligence based solution fetcher 32 when learning to match the requirement terms being extracted by the machine language processing engine 33 from the requirement definitions to the source code on the repositories.

Referring to FIG. 3, the system 100 for searching source code using definitions for requirements as search elements may include a source code confirming engine 39. This element provides for the interface between the stakeholders and the identified code produced by the search. The source code confirming engine 39 presents the source code in an arrangement that allows the stakeholders to view the arrangement on their user interface and select code that they agree meets the requirements. The source code confirming engine also includes an internal source code updater 41. The internal source code updater 41 sends code that was identified through search by the system 100 and approved by the stakeholder to the internal repositories, e.g., source code repository for storage.

In some examples, when the stakeholder approves the code, the system 100 automatically sequences the code with the remaining portions of code needed to meet the requirements of the project. In this manner a program code can be assembled.

Referring to FIG. 3, the hardware process that can be used by the elements of the artificial intelligence based solution fetcher is depicted in the system 100 by reference number 13. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs. These and other variations of a hardware processor subsystem are also contemplated in accordance with embodiments of the present invention.

FIG. 6 is a block diagram illustrating a process system 400 that can incorporate the system 100 for searching source code using definitions for requirements that is depicted in FIG. 3. FIG. 6 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 for two tier distribution optimization that can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. For example, in some embodiments, a computer program product is provided for system for searching source code using definitions for requirements. The computer program product includes a computer readable storage medium having computer readable program code embodied therewith. The computer readable storage medium can in some instances be non-transitory. The program instructions executable by a processor to cause the processor to extract search elements from requirement definitions of a requirement management tool for managing a project. The program instructions can also match, using the processor, the search elements to identify source code from source code repositories, wherein machine learning correlates the requirement definitions to source code subject matter. The computer instructions can also confirm, using the processor, the source code that is matching the search elements meets the requirement definitions of the requirement management tool.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
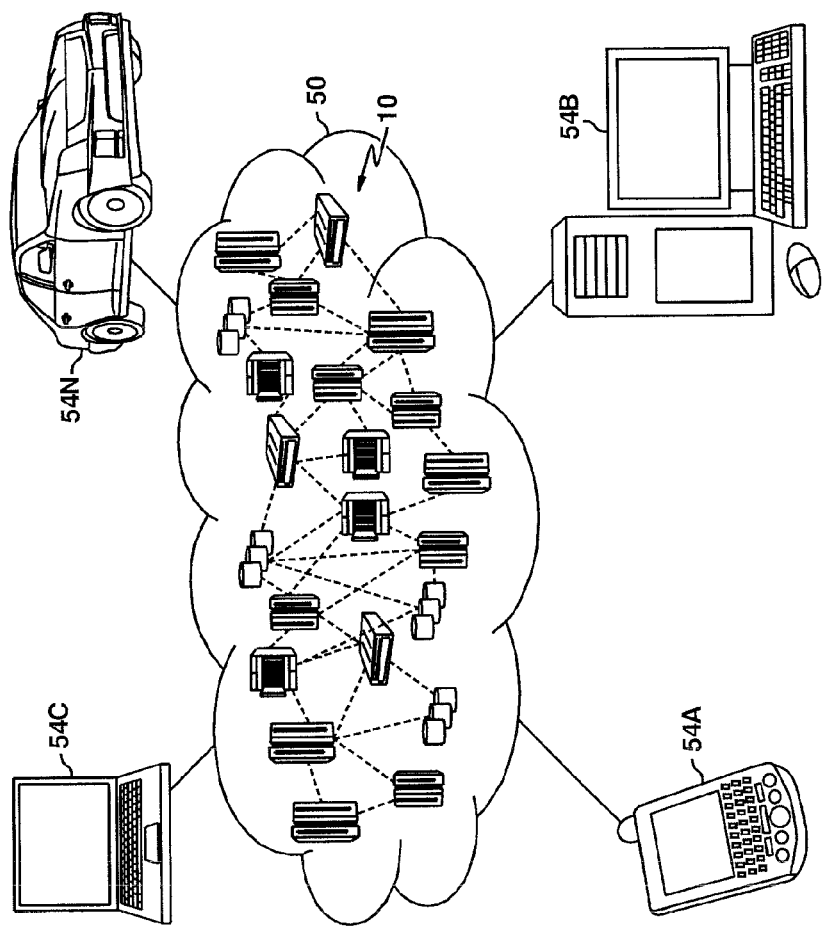
FIG. 7 depicts a cloud computing environment according to an embodiment of the present disclosure.

Referring now to FIG. 7, illustrative cloud computing environment 150 is depicted. As shown, cloud computing environment 150 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 54A-N shown in FIG. 10 are intended to be illustrative only and that computing nodes and cloud computing environment 150 can communicate with any type of computerized device over any type of network and/or network addressable connection (e.g., using a web browser).

Figure 8:
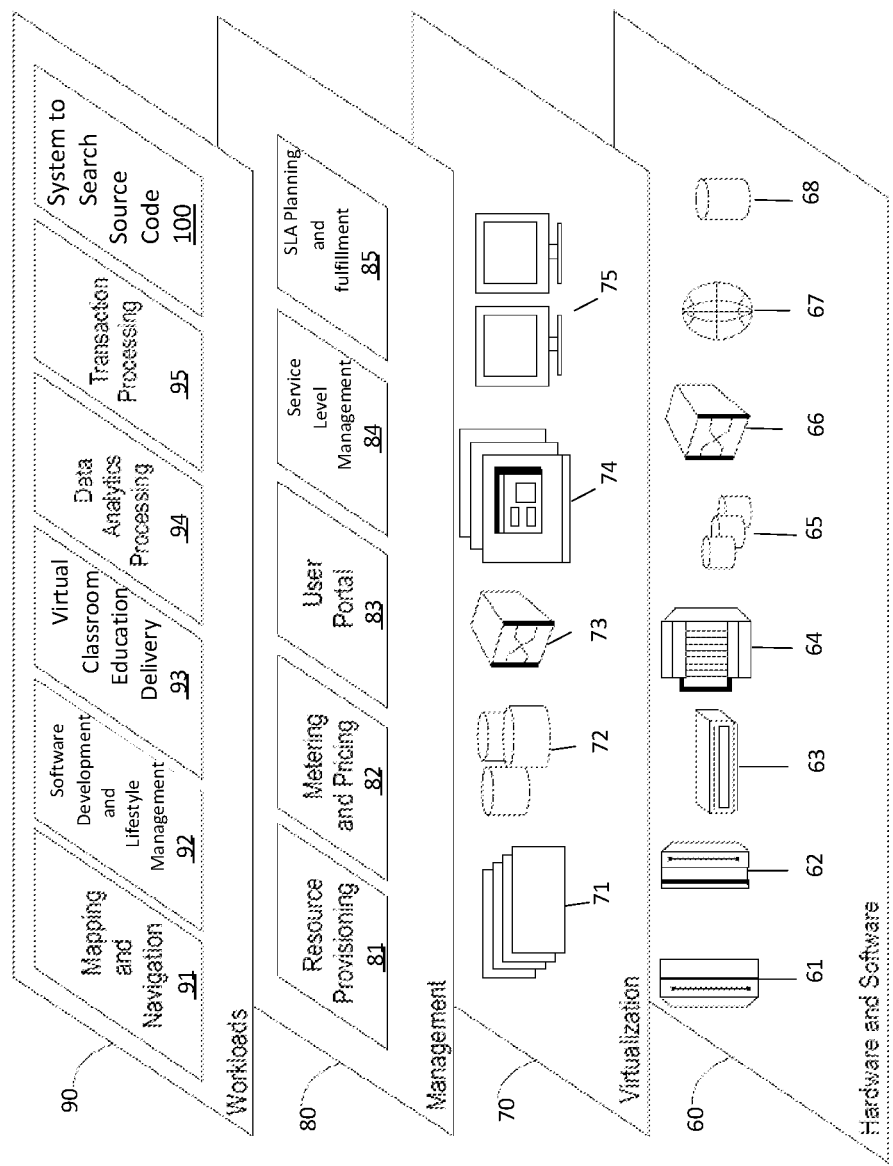
FIG. 8 depicts abstraction model layers according to an embodiment of the present disclosure.

Referring now to FIG. 8, a set of functional abstraction layers provided by cloud computing environment 150 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 100 that uses requirement definitions from a requirement management tool to search source code.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for searching for source code using requirement definitions from requirement management tools which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for searching source code using definitions for requirements comprising:
    extracting search elements from requirement definitions of a requirement management tool for managing a project;
    matching the search elements to identify source code from source code repositories, wherein machine learning correlates the requirement definitions to source code subject matter, the matching of search elements to identify source code comprises an artificial intelligence based solution fetcher that uses a naive Bayes classifier to classify code as completely matched or semi matches to the requirement definitions in combination with a Kernel density estimation to increase the accuracy of the naive Bayes classifier; and
    confirming the source code that is matching the search elements meets the requirement definitions of the requirement management tool.

2. The computer-implemented method of claim 1, wherein the extracting search elements from the requirement definitions comprises natural language processing.

3. The computer-implemented method of claim 1, wherein the source code repositories comprises an internal repository managed by a stakeholder that is managing the requirement management tool.

4. The computer-implemented method of claim 1, wherein the source code repositories comprises an external open source repository having a data source that is not managed by a stakeholder that is managing the requirement management tool.

5. The computer-implemented method of claim 1 further comprising updating the requirement definitions to include a list of source code search results for the source code that matched the search elements meeting the requirement definitions of the requirement management tool.

6. The computer-implemented method of claim 3, wherein the internal repository is updated to include the source code that matched the search elements meeting the requirement definitions of the requirement management tool.

7. The computer-implemented method of claim 1 further comprising creating an internal knowledge database including historical data illustrating the source code that matched the search elements meeting the requirement definitions of the requirement management tool, wherein the historical data contributes to training during machine learning.

8. A system for searching source code using definitions for requirements comprising:
    a hardware processor; and
    a memory that stores a computer program product, which, when executed by the hardware processor, causes the hardware processor to:
    extract search elements from requirement definitions of a requirement management tool for managing a project;
    match the search elements to identify source code from source code repositories, wherein machine learning correlates the requirement definitions to source code subject matter and the match of the search elements to identify source code comprises an artificial intelligence based solution fetcher that uses a naive Bayes classifier to classify code as completely matched or semi matches to the requirement definitions in combination with a Kernel density estimation to increase the accuracy of the naive Bayes classifier; and
    confirm the source code that is matching the search elements meets the requirement definitions of the requirement management tool.

9. The system of claim 8, wherein the extract search elements from the requirement definitions comprises natural language processing.

10. The system of claim 8, wherein the source code repositories comprises an internal repository managed by a stakeholder that is managing the requirement management tool.

11. The system of claim 8, wherein the source code repositories comprises an external open source repository having a data source that is not managed by a stakeholder that is managing the requirement management tool.

12. The system of claim 8 further comprising updating the requirement definitions to include a list of source code search results for the source code that matched the search elements meeting the requirement definitions of the requirement management tool.

13. The system of claim 10, wherein the internal repository is updated to include the source code that matched the search elements meeting the requirement definitions of the requirement management tool.

14. A computer program product for searching source code using definitions for requirements comprising a computer readable storage medium having computer readable program code embodied therewith, the program instructions executable by a processor to cause the processor to:
  extract, using the processor, search elements from requirement definitions of a requirement management tool for managing a project;
  match, using the processor, the search elements to identify source code from source code repositories, wherein machine learning correlates the requirement definitions to source code subject matter, and the match of the search elements to identify source code comprises an artificial intelligence based solution fetcher that uses a naive Bayes classifier to classify code as completely matched or semi matches to the requirement definitions in combination with a Kernel density estimation to increase the accuracy of the naive Bayes classifier; and
  confirm, using the processor, the source code that is matching the search elements meets the requirement definitions of the requirement management tool.

15. The computer program product of claim 14, wherein the extracting search elements from the requirement definitions comprises natural language processing.

\* \* \* \* \*